(12) United States Patent
Honma et al.

(10) Patent No.: US 7,771,631 B2
(45) Date of Patent: Aug. 10, 2010

(54) INJECTION MOLDING METHOD AND INJECTION MOLDING APPARATUS

(75) Inventors: Akhiro Honma, Tochigi (JP); Masatoshi Kobayashi, Tochigi (JP); Chiaki Mori, Tochigi (JP); Kouichi Tanizaki, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 308 days.

(21) Appl. No.: 11/954,923

(22) Filed: Dec. 12, 2007

(65) Prior Publication Data

US 2008/0143006 A1 Jun. 19, 2008

(30) Foreign Application Priority Data

Dec. 19, 2006 (JP) ............................. 2006-341713

(51) Int. Cl.
*B29C 45/77* (2006.01)
(52) U.S. Cl. ..................................... 264/40.1; 425/145
(58) Field of Classification Search ................ 264/40.1, 264/40.7, 328.1, 328.8; 425/145, 147
See application file for complete search history.

(56) References Cited

U.S. PATENT DOCUMENTS 3,695,800 A * 10/1972 Hutchinson et al. ......... 425/146
5,871,676 A * 2/1999 Fujita et al. ................. 264/40.1
5,900,259 A * 5/1999 Miyoshi et al. ............. 425/145
7,017,412 B2 * 3/2006 Thomas et al. .............. 425/145

FOREIGN PATENT DOCUMENTS

| JP | 1-106218 | 5/1986 |
|---|---|---|
| JP | 9-099458 | 4/1997 |
| JP | 11-46719 | 2/1999 |
| JP | 2000-061975 | 2/2000 |
| JP | 2000-127203 | 5/2000 |
| JP | 2003-053767 | 2/2003 |
| JP | 2005-297384 | 10/2005 |

OTHER PUBLICATIONS

Japanese Pat 2005-297384 published on Oct. 27, 2005, electronic translation.*
Japanese Publication 2003-53767 published Feb. 26, 2003, electronic translation.*

* cited by examiner

*Primary Examiner*—Jill L Heitbrink
(74) *Attorney, Agent, or Firm*—Rankin, Hill & Clark LLP

(57) ABSTRACT

An injection rate (cm$^3$/sec) of a screw feeder at the time of starting an injection is the largest and the injection rate (cm$^3$/sec) thereof gradually or sequentially decreases until an end of injection so that a temperature of a melted resin reaching the end portion of a cavity decreases within a range where the melted resin is not solidified.

6 Claims, 8 Drawing Sheets

ROUGHNESS

ONCE POSITION DIFFERENTIATION OF SURFACE ROUGHNESS (NARROW)

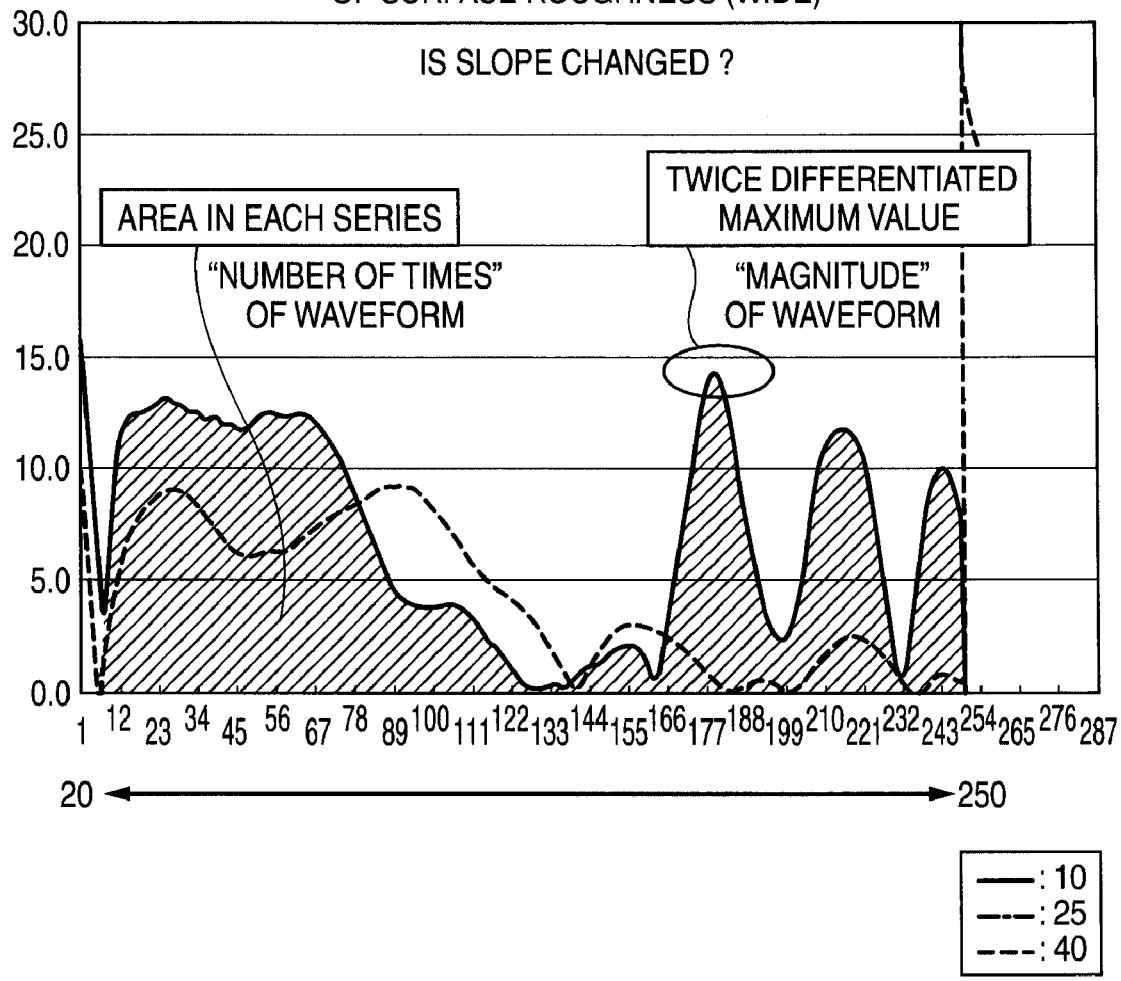

INJECTION MOLDING METHOD AND INJECTION MOLDING APPARATUS

This application claims foreign priority from Japanese Patent Application No. 2006-341713 filed on Dec. 19, 2006, the entire contents of which are hereby incorporated by reference.

BACKGROUND OF THE INVENTION

1. Field of the Invention

The present invention relates to an injection molding method and an injection molding apparatus that are used to form a resin molded component such as a tailgate and a bumper.

2. Related Art

Most of resin components for a vehicle are manufactured by injection molding. A complex shaped product, a large-scale product etc. have a problem that a resin cannot be injected into the end portion of a metal mold cavity. Accordingly, various methods have been suggested.

In JP-A-2000-127203, there is disclosed a hot runner apparatus including a receiving runner portion which extends substantially in parallel to a fixed die plate, a deliver runner portion, a hot runner portion which has heating means, a groove portion which is formed in a metal mold and to which the deliver runner portion is accessible, and driving means for driving the hot runner portion. The hot runner apparatus can be commonly used in a plurality of metal molds by driving the hot runner portion to allow an outlet opening to come into contact with a sprue port at the time of molding and by driving the hot runner portion in a reverse direction to allow the delivery runner portion to pass through the groove portion at the time of replacing a stage so that the metal mold is separated from the hot runner portion.

In JP-A-2005-297384, there is disclosed an injection molding apparatus including a plurality of injection nozzles which inject a melted resin into a mold cavity and control means which is formed in each nozzle so as to instruct an injection ratio of the resin to be injected from each injection nozzle. The control means has a memory which stores the injection ratio corresponding to time elapsed from the start of injection. The injection ratio stored in the memory is set such that injection pressure of each injection nozzle is equivalent to each other.

In JP-A-09-099458, there is disclosed a technique for preventing inferior phenomenon arising when a molding product is manufactured by resonating a whole metal mold with an ultrasonic vibrator at a half of a wavelength by an ultrasonic wave or by providing a resonator resonated by a vibration in a movable metal mold so as to be resonated by an ultrasonic wave and to fill a resin at a high speed, so that a skin layer is reduced.

In an injection molding, a low injection pressure is essentially demanded in order to omit a post process such as a deburring process, to mold a large-scale component, to attain an unmanned system, to perform multiple processes, to reduce a cost, and the like.

However, in a low-pressure molding, when a pressure at the time of holding a pressure decreases, a contraction force during a cooling solidification is larger than a holding pressure force. As a result, an outer appearance at a cavity end portion is poor, where the cavity end portion is a position in which a pressure supply and a flow supply are not smoothly conducted. In order to prevent the poor outer appearance, the holding pressure is generally maintained at 30 MPa or more.

FIG. 1 is a graph showing a relation between a state (temperature) and a specific volume of a resin used in an experiment that is conducted by the inventors. As shown in the graph, when the temperature of the resin filled in the cavity is high, a contraction rate (specific volume) increases together. Further, a first inflection point T1 where a slope of the specific volume is steep and a second inflection point T2 where the slope of the specific volume is less steep are found during the time the melted resin is cooled.

In JP-A-2000-127203, the hot runner apparatus is commonly used in a plurality of metal molds by separating the hot runner apparatus from the metal mold. However, a position where a nozzle of the hot runner apparatus comes into contact with the metal mold is always the same. Accordingly, a resin receiving port needs to be provided at the same position even when a shape of a product is different. For this reason, when a gate is set depending on the shape of the product, a distance from the resin receiving port to the gate may increase. Thus, the position of the resin receiving port is not always suitable for the shape of the product.

In JP-A-2005-297384, a flow amount of the resin flowing in a distributed runner is calculated so that an injection rate corresponds to a case where injection pressures of injection nozzles are equal to each other. When the resin is injected at such an injection rate, the injection pressures of the injection nozzles become equal to each other. Accordingly, the pressure in the cavity can be lowered. However, a temperature control is not mentioned. As a result, it is not possible to predict a reduction of a contraction amount in the case of conducting an injection molding of a large-sized molded product.

In JP-A-09-099458, when an injection is conducted at the injection rate of 150 $cm^3$/sec or more by using an ultrasonic vibrator capable of generating a vibration frequency in the range of 1 kHz to 10 kHz, a flow of the resin is enhanced. However, an apparatus for vibrating a whole metal mold of a large-sized component by using the ultrasonic vibrator capable of generating a vibration frequency in the range of 1 kHz to 10 kHz is large in size. As a result, it is not suitable to conduct an injection molding of, for example, a large-sized component of a vehicle.

In addition, as described above, a decrease in pressure of an injection molding method has been demanded. However, when the pressure at the time of holding a pressure is lowered, a deformation of a product arises. Likewise, the methods disclosed in the above documents cannot solve such a problem that the deformation of the product arises when the pressure at the time of holding a pressure is lowered.

SUMMARY OF THE INVENTION

One or more embodiments of the present invention solve a problem that a resin cannot be filled into an end portion of a cavity when the resin is injected at a low temperature from a beginning. In one or more embodiments of the present invention, a contraction amount can decrease even when the resin is injected at a low temperature from the beginning. For example, it is possible to conduct a low-pressure molding process at a pressure of 30 MPa or less at the time of holding a pressure.

According to one or more embodiments of the present invention, in an injection molding method of feeding a melted resin into a cavity of a metal mold by use of a nozzle with a screw feeder, an injection rate ($cm^3$/sec) of the screw feeder at an injection start is the largest, and the injection rate ($cm^3$/sec) thereof decreases gradually or sequentially until an injection end, so that a temperature of the melted resin reaching the end portion of the cavity is as low as possible so long as the melted resin is not solidified.

By a setting that the injection rate is large at the time of an injection start and the injection rate becomes small until the time of an injection end, the flow speed of the melted resin in the cavity is fast in the periphery of the nozzle and the flow speed thereof is slow in the periphery of the end portion. Accordingly, it takes time to fill the resin into the end portion and thus the temperature of the melted resin at the end portion decreases.

When an injection molding apparatus implementing the injection molding method has a plurality of nozzles, each of the nozzles may meet the above-described conditions so that the injection rate ($cm^3$/sec) of the screw feeder of each of the nozzles meets the above-described conditions at the time of the injection start and the injection rate ($cm^3$/sec) thereof decreases gradually or sequentially until the time of the injection end.

An injection stroke of the screw feeder may be divided into various areas and the following steps 1) to 4) may be carried out:

1) pass temperature data is temporarily set at each of the areas so that the screw feeder gradually or sequentially varies the injection rate to a desired rate until the injection end, the pass temperature data is substantially input, and the pass temperature data is recorded in an electric recording medium by a program execution portion as a program in a system having an electronic calculator;

2) a molded product is formed using an injection molding apparatus capable of using the pass temperature data by gradually or sequentially varying the injection rate to a desired rate until the injection end on the basis of the pass temperature data;

3) when the molded product does not meet a certain condition after the molded product is formed, the injection rate at each of the areas is changed and the changed injection rate is substantially input by the program execution portion; and 4) the present step returns to Step 1) to repeat Steps 1) to 3) and the pass temperature data is set at each of the areas so that the injection rate of the screw feeder varies to a desired rate gradually or sequentially until the injection end, and the pass temperature data is recorded in the electronic recording medium or physically recorded in a recording medium to be usable by the program execution portion into which the pass temperature data is substantially input.

An injection molding apparatus using the recorded pass temperature data may be configured by including an injector injecting a material; a mold configuring a cavity to be filled with the injected material; memory for storing the pass temperature data; a temperature sensor disposed at cavity positions corresponding to an entrance side and an exit side of each flow stroke position area; controller monitoring a temperature condition of the temperature sensor and an injection condition of the injector and controlling the injector on the basis of the pass temperature data stored in the memory; and a judgment portion judging an abnormality on the basis of the injection condition.

The injection condition may be calculated by, for example, the following processes so that the temperature of the melted resin reaching the end portion of the cavity decreases as low as possible within a temperature range where the melted resin is not solidified.

Calculation Example 1

Screw Feeder Stroke Division Process

An advancing stroke of the screw feeder is divided into two position areas, that is, a high-flow stroke position area with high speed (where the injection rate is large) and a low-flow stroke position area with low speed (where the injection rate is small).

First Calculation Process

Data related to a cavity condition including a shape and a material condition of the cavity and a material condition including a flow condition and a solidification condition of the resin are input from an interface or an external memory. Subsequently, when a temperature and an injection pressure of the resin at an entrance side (nozzle) are input, a routine for calculating a flow speed and a pass temperature of the leading end of the resin filled in the cavity is carried out, so that the flow speed and the pass temperature of the leading end of the resin are calculated in the high-flow stroke position area with high speed.

Second Calculation Process

The data related to the cavity condition including the shape and the material condition of the cavity and the material condition including the flow condition and the solidification condition of the resin are input from the interface or the external memory. Subsequently, when the temperature and the flow speed of the resin at an entrance side are input, a routine for calculating a flow speed and a pass temperature of the resin is carried out, so that a pass deceleration speed and a reaching temperature of the resin are calculated in the low-flow stroke position area with low speed.

Second Calculation Example 2

Screw Feeder Stroke Division Process

An advancing stroke of the screw feeder is divided into three position areas, that is, a high-flow stroke position area with high speed (where the injection rate is large), an intermediate-flow stroke position area with intermediate speed (where the injection rate is intermediate), and a low-flow stroke position area with low speed (where the injection rate is small).

First Calculation Process to Third Calculation Process In the first calculation process, the pass flow speed and the pass temperature of the resin are calculated in the high-flow stroke position area with high speed.

In the second calculation process, the data related to the cavity condition including the shape and the material condition of the cavity and the material condition including the flow condition and the solidification condition of the resin are input from the interface or the external memory.

Subsequently, when a pass flow speed and an elapsed temperature of the end material at an entrance side are input, a routine for calculating a pass flow speed and a pass temperature of the resin filled in the cavity is carried out, so that the pass flow speed and the pass temperature of the resin are calculated in the intermediate-flow stroke position area with intermediate speed (where the injection rate is intermediate).

In a third calculation process, a pass flow speed and a pass temperature are calculated in the low-flow stroke position area with low speed (where the injection is small).

In the above-described injection condition calculating method, for example, a melted resin is injected at a temperature more than a first inflection point T1 where a slope of a specific volume is steep as the resin is cooled. When the melted resin is further cooled, the melted resin reaches a temperature below a second inflection point T2 where the slope of the specific volume is less steep. In this way, the melted resin is injected as low as possible so long as the melted resin reaching the end portion of the cavity is not solidified.

Although it is different depending on the type of the resin, the temperature of the inflection point T1 may be set to be in the range of 190° C. to 200° C. and the temperature of the inflection point T2 may be set to be in the range of 110° C. to 130° C.

According to an injection molding method of the embodiments of the invention, a temperature of a resin is controlled as low as possible so as to be within a temperature range where the resin at the end portion of a cavity is not solidified. Accordingly, it is possible to lower a pressure in the cavity, and thus it is possible to realize a decrease in size of an injection molding apparatus. Moreover, it is possible to increase a maximum moldable range and to perform multiple processes in an easy manner.

Other aspects and advantages of the invention will be apparent from the following description and the appended claims.

DETAILED DESCRIPTION OF THE EXEMPLARY EMBODIMENTS

Figure 2:
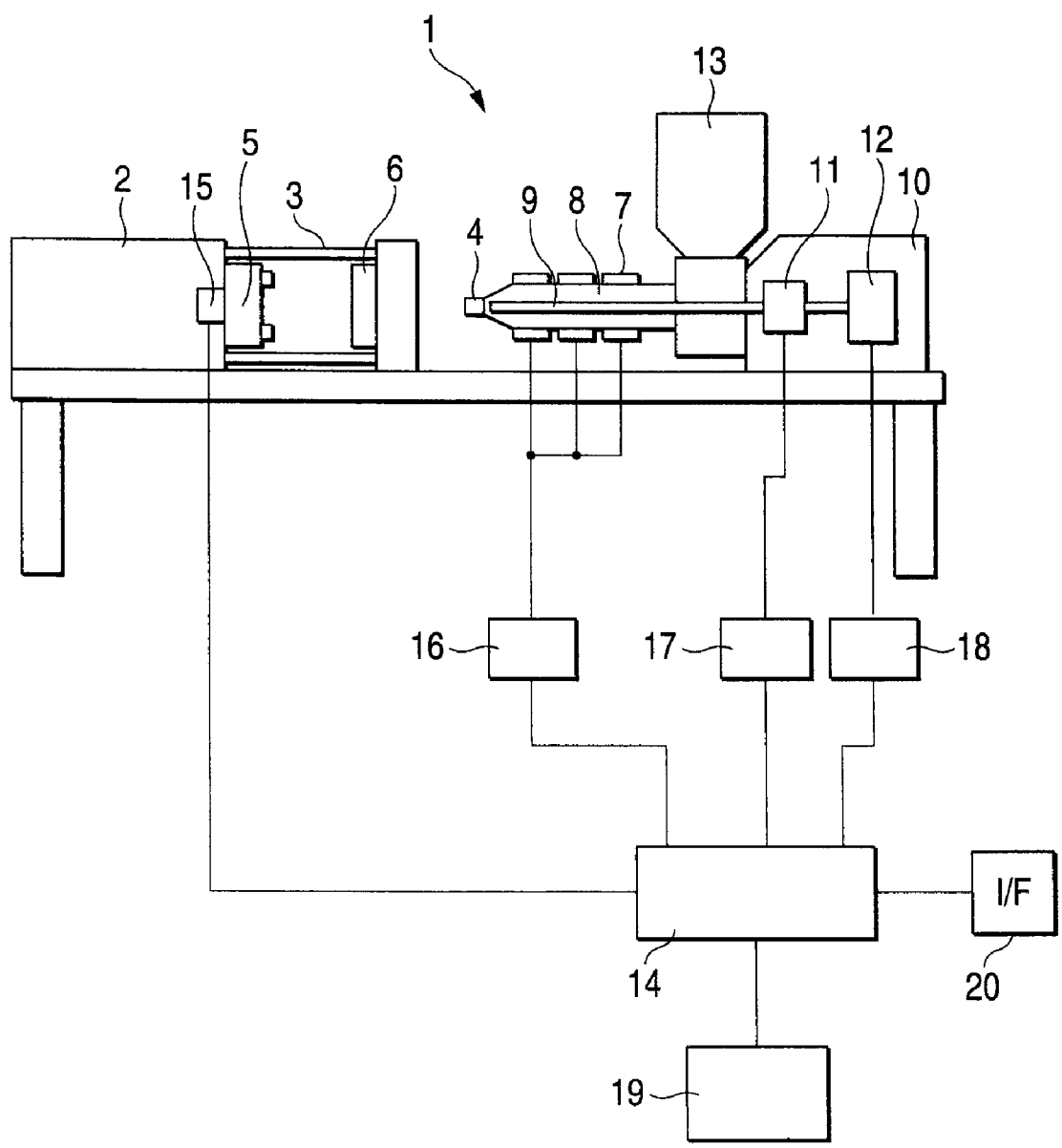
FIG. 2 is a schematic view showing an injection molding apparatus used to implement an injection molding method according to the invention.

Hereinafter, exemplary embodiments of the invention will be described with reference to drawings. FIG. 2 is a schematic structure view showing an injection molding apparatus implementing an injection molding method. An injection molding apparatus 1 is configured such that a sufficient pressure is applied by a hydraulic mold clamping mechanism 2 during a filling operation.

In the mold clamping mechanism 2, four tie bars 3 as supports which guide an opening or closing operation of a metal mold and to which a mold clamping force is applied are used. At this time, a movable metal mold 5 is firmly fastened to a fixed metal mold 6 by the tie bar 3 in the state where a nozzle 4 is attached to a movable metal mold 5.

Meanwhile, a heating cylinder 8 around which a band heater 7 is wound is disposed in an injection molding device 10, and a screw feeder 9 is disposed in the inside of the heating cylinder 8. By rotating the screw feeder, plasticization operations like a feed, a compression, a mixture, a melt, and a measurement of a resin are conducted. An injection cylinder 11 feeds a resin to the screw feeder 9, and the screw feeder 9 is rotated by a motor 12 (hereinafter, referred to as an electric motor 12) that is driven by a hydraulic or electric operation.

When the resin is input to a hopper 13, the resin is heated and melted by a heat of the band heater 7 while being transported in the heating cylinder 8. Subsequently, the resin is moved to the nozzle 4, and then injected from the nozzle 4 to the fixed metal 6.

Meanwhile, a central control unit 14 is connected to a temperature/pressure sensor 15 attached to the movable metal 5, a temperature control unit 16 connected to the band heater 7, an injection control unit 17 connected to an injection cylinder 11, a rotation control unit 18 connected to the electric motor 12, and a memory 19.

Since the central control unit 14 is connected to an interface 20, the central control unit 14 is configured to receive data from the outside as well as the memory 19.

Figure 3:
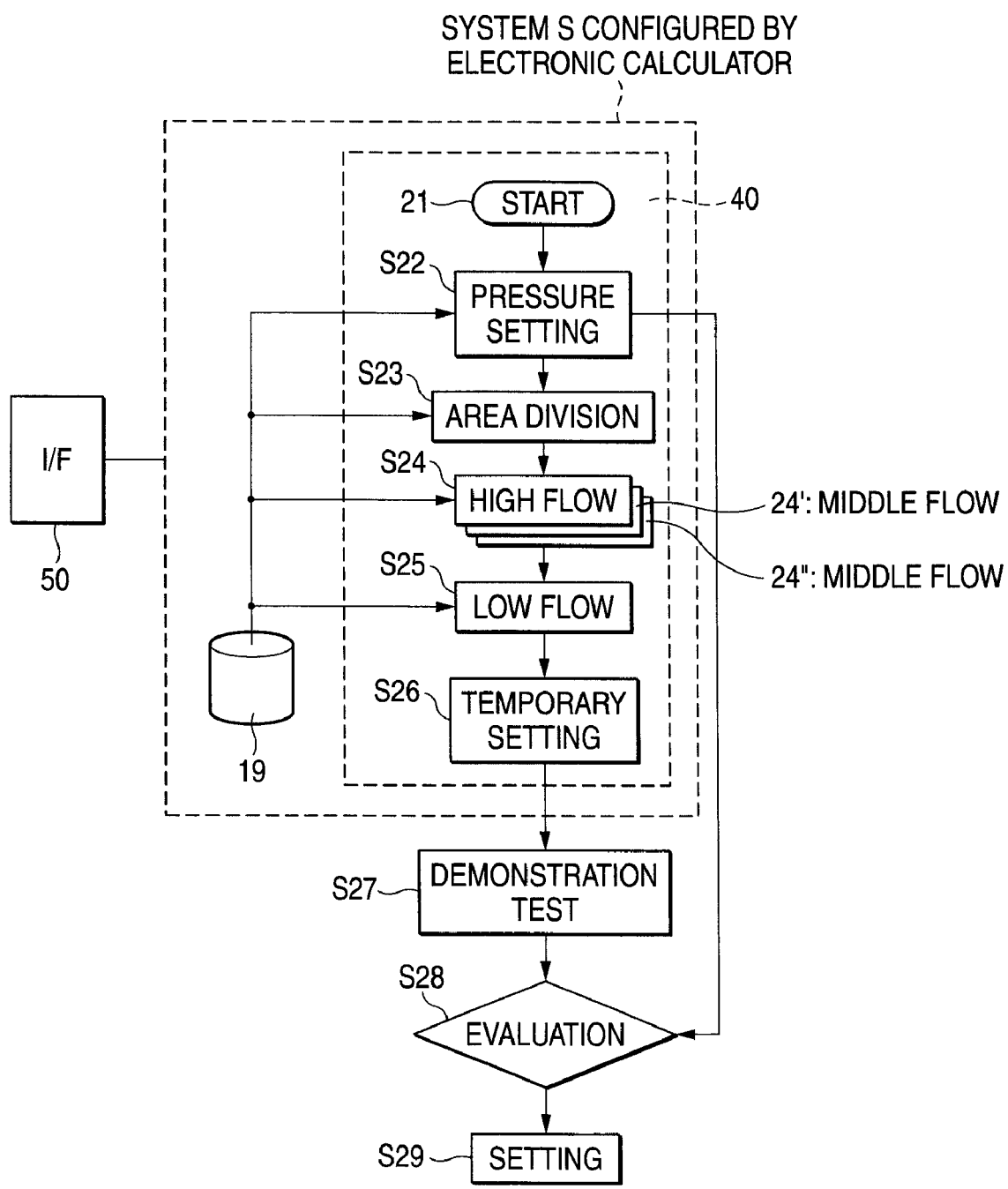
FIG. 3 is a flowchart calculating an injection molding condition of the injection molding method according to the invention.

FIG. 3 is a calculation flowchart calculating an injection molding condition of the injection molding method. This is a program executed by a so-called electronic calculator. For example, as PROM, a program 30 can be stored in the central control unit 14 and be stored in a program storage of the central control unit 14 through a network using the interface 20. However, it is preferable to use a system S configured by the electronic calculator in consideration of a debug and a maintenance. Hereinafter, first and second embodiments will be described with reference to FIG. 2.

First Embodiment

When a program starts in Step 21 shown in FIG. 3, pressure data is set in Step 22. Specifically, an external memory 19 capable of storing electric data input pressure data to a program execution portion 40, and then the program execution portion 40 stores the pressure data. In this case, as a pressure setting value, specifically the system S executes the program 30 by storing it inside thereof at the time of setting data by estimation when it is not possible to use similar past data based on a resin to be used and a size of a molded component. At this time, the program execution portion 40 constituting the system S informs an operator who operates the system S that the similar past data etc. cannot be used by the use of a notification display (not shown) using five senses or an interface 50. Subsequently, the program execution portion 40 asks an input of the pressure data, and then the operator inputs the pressure data from the interface 50 by estimating the pressure data in terms of the operator's experience or prediction. In Step 22, setting the pressure data is completed.

In Step 23, a screw feeder stroke division process in which an advancing stroke (feed speed) of the screw feeder 9 of an injection mechanism is divided into at least two position areas, that is, a high-flow stroke position area with high speed and a low-flow stroke position area with low speed is conducted. For example, the low-flow stroke position area with low speed is set such that a melted material reaches the last filled portion below a temperature of an inflection point T1 where a slope of a specific volume increases as the resin is cooled. More preferably, the low-flow stroke position area with low speed is set to a temperature below an inflection point T2 where a slope of the specific volume is less steep. Additionally, an operator who operates the system S sets an advancing stroke to be within a temperature range where the melted resin (melted material) reaching the end portion (the last filled portion) of the cavity is not solidified. Specifically, the start point of the low-flow stroke position area with low speed is determined. However, for example, the position may be simply set to the substantially center of the whole advancing stroke of the screw feeder at first.

The other regions correspond to stroke position areas different from the high-flow stroke position area with high speed. Among the other regions, the operator determines the end point of the high-flow stroke position area with high speed. In the case where the whole advancing stroke of the screw feeder is divided into only two position areas, the start point of the low-flow stroke position area with low speed that has been determined naturally corresponds to the end point of the high-flow stroke position area with high speed. In the case where the whole advancing stroke of the screw feeder is divided into three or more position areas, the operator determines the corresponding end point of the corresponding position area one by one after the end point of the high-flow stroke position area with high speed is determined. The number of the position areas may be an arbitrary natural number which is not less than two. The start point of the low-flow stroke position area with low speed, the end point of the high-flow stroke position area with high speed, and the end points of the other stroke position areas may be mechanically calculated and determined by the system S so as to have the same interval therebetween, or may be arbitrarily determined by the operator as described above. When the corresponding points are determined, the corresponding points are input from the interface 50 of the system S. In Step 23, dividing the advancing stroke position areas of the screw feeder is completed.

As described above, for example, an exemplary setting value of the temperature of the resin used to mold the bumper may be set such that the temperature of the inflection point T1 is in the range of 190° C. to 200° C. and the temperature of the inflection point T2 is in the range of 110° C. to 130° C.

In Step 24, the program execution portion 40 conducts a calculation in the high-flow stroke position area with high speed. At this time, data related to a cavity condition including at least the shape and the material condition of the cavity, and a material condition including at least a flow condition and a solidification condition of the resin is used, which is input to the program execution portion 40 from the interface 50 or the external memory 19, and then the data is stored in the program execution portion 40. The pressure data is already input to the program execution portion 40 in Step 22, that is, the injection pressure of the resin at an entrance side (nozzle) is already obtained. Thus, additionally, the operator who operates the system S input the injection temperature thereof at the entrance side (nozzle) to the program execution portion 40. At this time, the program execution portion 40 asks an input of the injection temperature. In this way, when the resin filled in the cavity passes the end point of the high-flow stroke position area with high speed, the program execution portion 40 conducts a routine for calculating a pass flow speed and pass temperature of the leading end of the resin.

As described above, for example, a general temperature of the resin used in a bumper molding is used as the temperature at the entrance side. That is, the temperature may be more than the inflection point T1 in the range of 190° C. to 200° C. However, in consideration of a calculation in the low-flow stroke position area with low speed that is carried out in Step 25 and a fact that a temperature of a melted resin (melted material) that reaches the end portion (the last filled portion) of the cavity is below the inflection point T2 where a slope of the specific volume is less steep and is within a temperature range where the resin is not solidified, the temperature at the entrance side (nozzle) in the start point of the high-flow stroke position area with high speed may be low as much as possible. In some cases, the temperature may be less than the inflection point T1 in the range of 190° C. to 200° C. In this case, as a temperature setting value, specifically the program execution portion 40 stores the temperature data, that is, the temperature of the resin at the entrance side (nozzle) from the external memory 19 when it is possible to use similar past data based on a resin to be used and a size of a molded component or other similar past data.

In Step 24' and Step 24" (Calculation Example 2), a calculation in the intermediate-flow stroke position area with intermediate speed is carried out. At this time, data related to a cavity condition including at least the shape and the material condition of the cavity in every advancing stroke position area, and a material condition including a flow condition and a solidification condition in every advancing stoke position area of the screw feeder is used, which is input to the program execution portion 40 from the interface 50 or the external memory 19, and then the data is stored in the program execution portion 40. The pass flow speed and the pass temperature of the leading end of the resin, which is filled in the cavity, at the time of passing the end point of the high-flow stroke position area with high speed is already calculated by using the routine for calculating the pass flow speed and the pass temperature of the leading end of the resin. The calculated flow speed and temperature are stored in the program execution portion 40. After the pass flow speed and the pass temperature of the leading end of the resin stored in the program execution portion 40, that is, the flow speed and the flow temperature of the resin at an entrance side (the intermediate-flow stroke position area with intermediate speed) is input, the program execution portion 40 conducts a routine for calculating the pass flow speed and pass temperature of the leading end of the resin when the resin material filled in the cavity passes the end point of the intermediate-flow stroke position area with intermediate speed which is now being calculated. The detail thereof will be described below (in a second embodiment).

In Step 25, a calculation in the low-flow stroke position area with low speed is carried out. At this time, the deceleration speed and the temperature of the melted resin (melted material) that reaches the end portion (the last filled portion) of the cavity are calculated on the basis of the flow speed and the flow temperature of the leading end of the resin passing the end point of the advancing stroke position area which are calculated in the previous advancing stroke position area.

Specifically, data related to a cavity condition including at least the shape and the material condition of the cavity in every advancing stroke position area, and a material condition including a flow condition and a solidification condition in every advancing stoke position area of the screw feeder is used, which is input to the program execution portion 40 from the interface 50 or the external memory 19, and then the data is stored in the program execution portion 40. In the previous step, the pass flow speed and the pass temperature of the leading end of the resin, which is filled in the cavity, at the time of passing the end point of the previous advancing stroke position area are calculated by a routine for calculating the pass flow speed and the pass temperature of the leading end of the resin. The calculated flow speed and temperature are stored in the program execution portion 40. In Step 25, necessary elapsed time data is set.

In detail, the necessary elapsed time data is input to the program execution portion 40 from the external memory 19, and the data is then stored in the program execution portion 40. The necessary elapsed time data, that is, necessary elapsed time means that a stroke in the low-flow stroke position area with low speed is preceded at a decelerated speed without causing the above-described external problem and then the flow speed of the leading point of the resin becomes 0 m/sec. The necessary elapsed time is substantially determined by an experience on the basis of a stroke and an average sectional area of the resin material and the molded component. In this case, as a setting value of the necessary elapsed time, it is possible to set the data by estimation when it is not possible to use past similar data based on the size of the resin material and the molded component or the above-described similar data.

Specifically, in the case where the necessary elapsed time data is set by estimation when it is not possible to use the past similar data etc., the program execution portion 40 informs the operator who operates the system S that the similar past data etc. cannot be used by the use of the notification display (not shown) using five senses or the interface 50. Subsequently, the program execution portion 40 asks an input of the necessary elapsed time data, and then the operator inputs the necessary elapsed time data from the interface 50 by estimating the necessary elapsed time data in terms of the operator's experience or prediction. In Step 25, setting the necessary elapsed time data is completed.

In the first half of Step 25, the necessary elapsed time data input to the program execution portion 40, that is, the necessary elapsed time at an exit side (the end portion of the cavity) in the low-flow stroke position area with low speed is calculated in order to prevent the above-described external problem. Additionally, the flow speed and the flow temperature of the resin at the entrance side (nozzle), that is, the flow speed and the flow temperature of the leading end of the resin at the time the resin filled in the cavity passes the end point of the previous advancing stroke position area is stored in the program execution portion 40. When the flow speed and the flow temperature of the leading end of the resin stored in the program execution portion 40, that is, the flow speed and the flow temperature of the resin at the entrance side (the intermediate-flow stroke position area with intermediate speed) is input, the program execution portion 40 conducts a routine for calculating a deceleration speed of the advancing screw feeder until the resin filled in the cavity, that is, the melted resin (melted material) which is now being calculated in the low-flow stoke position area with low speed reaches the end portion (the last filled portion) of the cavity, and a temperature of the melted resin (melted material) which reaches the end portion (the last filled portion). The calculated deceleration speed may be a fixed value calculated in theory on the basis of the stroke and the necessary elapsed time. The deceleration speed value may be obtained from the variation in speed at the time the advancing operation of the screw feeder is stopped by a brake (not shown) that exerts the performance of the theoretically calculated deceleration speed.

As described above, for example, a general temperature of the resin used in a bumper molding is used as the temperature at the end portion of the cavity. That is, the temperature may be below the inflection point T2 in the range of the 110° C. to 130° C. Appropriately, on the basis of the calculation in the low-flow stroke position area with low speed in Step 25, the temperature of the melted resin (melted material) that reaches the end portion (the last filled portion) of the cavity may be below the inflection point T2 where the slope is less steep and within a temperature range where the resin is not solidified.

In Step 26, on the basis of the calculations in Step 24 and Step 25, a temporary molding condition at the time the resin is completely filled in the metal mold is set so that the temperature thereof is in the range of 190° C. to 200° C. in the periphery of a gate and the temperature thereof is in the range of 110° C. to 130° C. in the periphery of the end portion.

In Step 27, a demonstration test of the injection molding apparatus is carried out on the basis of the temporary molding condition. Specifically, a temperature sensor and a pressure sensor are installed in a position of the cavity corresponding to the advancing position area of the screw feeder, that is, a position where the screw feeder advances to the end point of a certain advancing position area and the leading end of the volume of the resin, which is injected to the cavity by the screw feeder, reaches, so as to mainly check whether or not the resin passes at a desired temperature in every advancing position area of the screw feeder. When there is a temperature difference and the temperature of the demonstration test is high, the injection pressure of the screw feeder at every advancing position area of the screw feeder decreases. Alternatively, when the temperature of the demonstration test is low, the injection pressure of the screw feeder at every advancing position area of the screw feeder increases. That is, the flow speed at every advancing position area of the screw feeder increases. In terms of the demonstration test, a regulation of the set parameter is possible. The values obtained by experience are fed back to the calculations in Steps 22, 24, and 25, and thus it is possible to shorten a total calculation time on the basis of the feed-back values.

In Step 28, the demonstration test is estimated. At this time, when the result of the demonstration test does not meet a certain condition, the present step returns to Step 22. Then the pressure parameter is changed and the procedures in Step 23 to 28 are carried out again.

Specifically, it is possible to omit a setting data by estimation. At this time, specifically the program execution portion 40 informs the operator who operates the system S that the pressure data cannot be used by the use of notification of the display (not shown) using five senses or the interface 50. Subsequently, the program execution portion 40 asks an input of the pressure parameter, and then the operator inputs the pressure parameter (data) from the interface 50 by estimating the pressure data in terms of the operator's experience or prediction. In Step 22, setting the pressure data is completed.

Normally, it is possible to select another input mode. In general, the program execution portion 40 decreases the preset injection pressure (parameter) of the screw feeder at every advancing position area of the screw feeder when the temperature of the demonstration test is high. Alternatively, the program execution portion 40 increases the preset injection pressure (parameter) of the screw feeder at every advancing position area of the screw feeder when the temperature of the demonstration test is low. Accordingly, the range of the preset values gradually decreases, and differences between the preset values of the injection pressure parameters and desired values in the demonstration test decrease. For example, when the range is 100 in percentage, the range is first decreased by 70, and is then increased by 50. In this way, the range of the preset values is gradually decreased.

Various data including temperature data which need to be set are stored in an electric recording medium or physically stored in other recording medium so as to be usable. Specifically, numerical data may be printed on a sheet in one or two dimension barcode. Alternatively, the numerical data may be recorded on a punch card or a punch tape in which a hole is punched, or the numerical data may be recorded in a magnetic tape, CD-ROM, etc. Accordingly, storage and portability are improved, which is convenient in a manufacturing site.

In addition, as a method of obtaining a specific injection condition, the injection condition may be obtained such that an arbitrary injection rate at the time of starting the injection is determined in advance, and an arbitrary reduction rate $K_i$ (where $0<K_i<1$) of the arbitrary injection rate is determined whenever it is necessary or a fixed arbitrary reduction rate $K_{const}$ (where $0<K_{const}<1$) is determined. After an injection analysis and a demonstration test in each injection condition are carried out, a product may be molded finally by an injection.

Second Embodiment

FIG. 3 shows another embodiment. When the program starts in Step 21, the pressure data is set in Step 22.

In Step 23, the advancing stroke of the screw feeder 9 of the injection mechanism is divided into three regions, that is, a compression stroke, an alleviation stroke, and a deceleration stroke by setting the high-flow stroke position area with high speed which corresponds to an extremely fast compression stroke, the low-flow stroke position area with low speed which corresponds to an extremely slow deceleration stroke, and a transition area therebetween which corresponds to an alleviation stroke. For example, in the case where a screw feeder of a stroke of 70 mm is used, the advancing stroke may be divided such that the compression stroke area is set to be in the range of 70 to 50 mm, the alleviation stroke area is set to be in the range of 50 to 25 mm, and the deceleration stroke area is set to be in the range of 25 to 0 mm.

Figure 6:
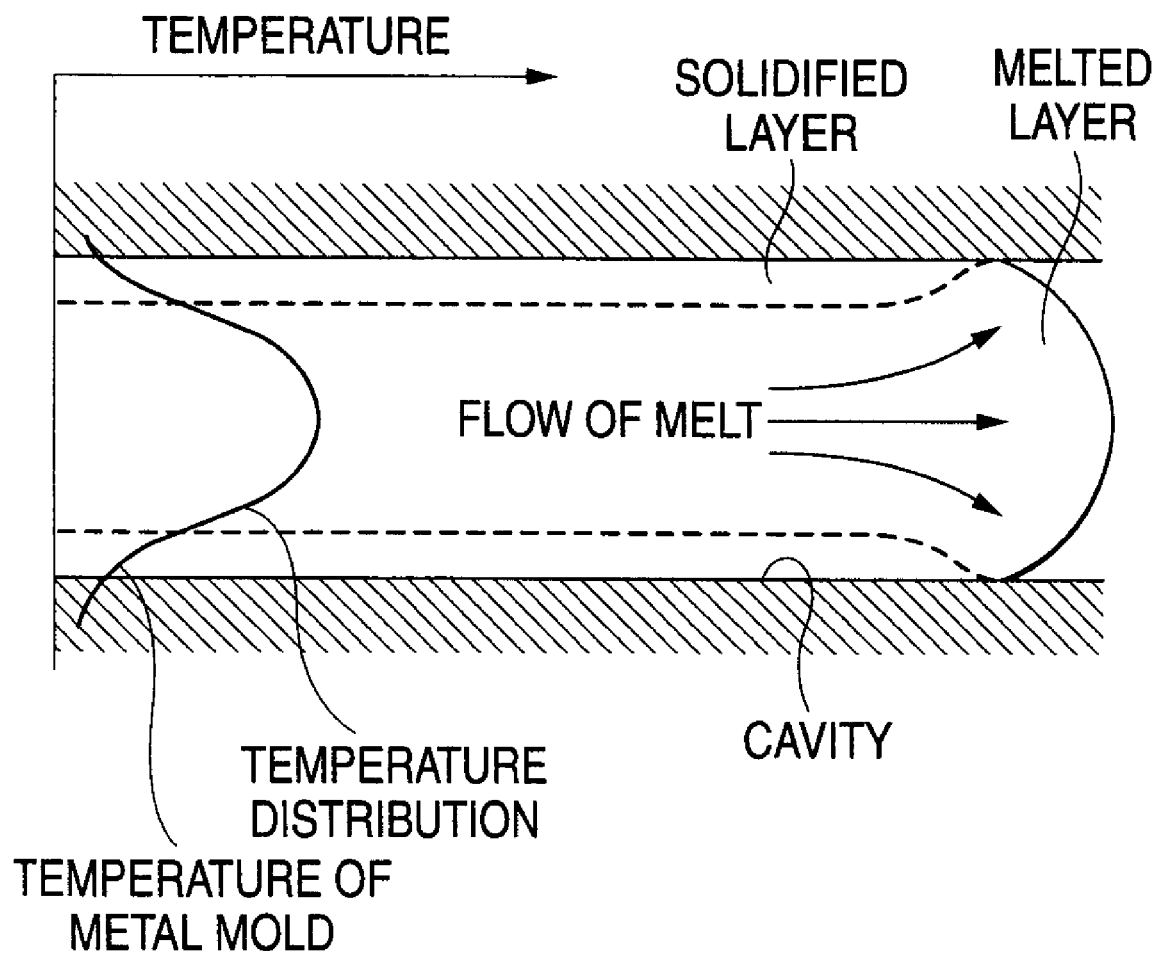
FIG. 6 is a graph showing a relation between a resin flow and a temperature distribution.
Figure 7:
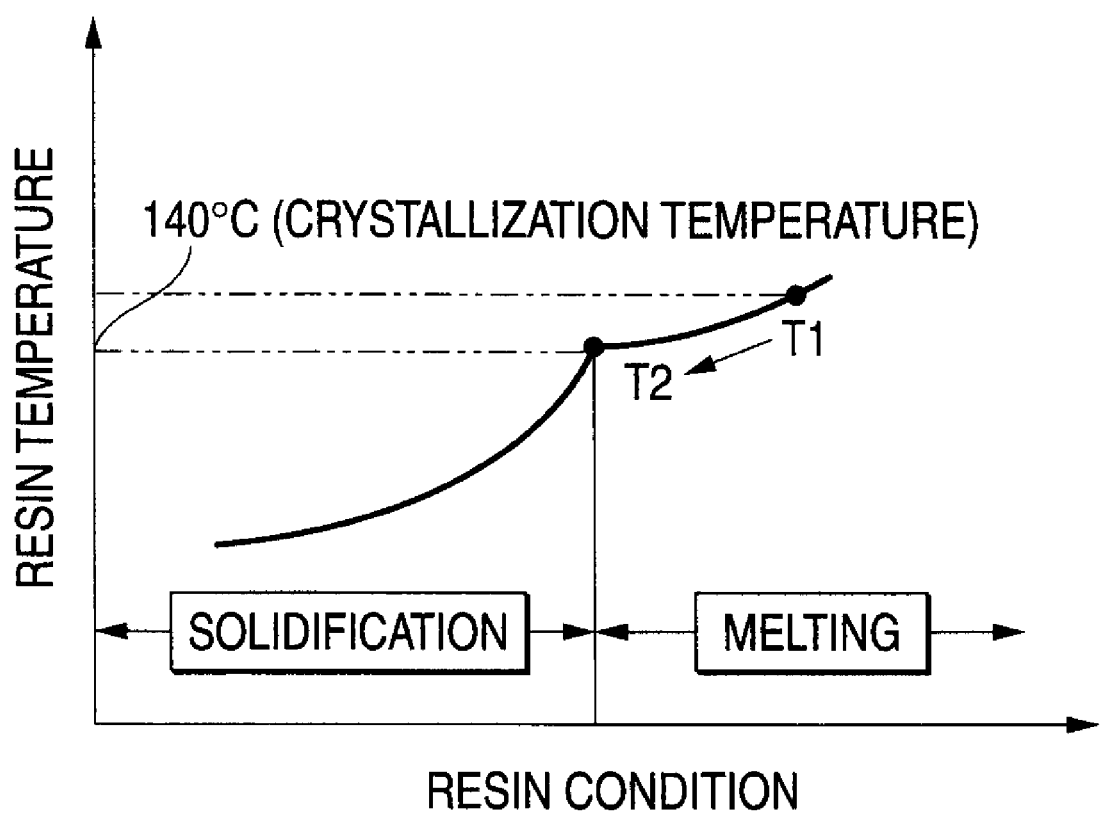
FIG. 7 is a graph showing a relation between a resin temperature and a resin condition (melt and solidification).

In Step 24, the calculation in the high-flow position area with high speed is carried out. In Step 24' and Step 24", the calculation in the intermediate-flow position area with intermediate speed (alleviation stroke) is carried out. In Step 25, as described above, the calculation in the low-flow position area with low speed is carried out, but the temperature of the resin may be considered in two different ways. The distribution of the flow and temperature of the resin is shown in FIG. 6. The relation of the temperature, melt, and solidification of the resin is shown in FIG. 7. That is, the temperature of the resin may be considered in two different ways such that one is a temperature of a melted layer excluding a solidified portion and the other is an average temperature between the melted layer and a solidified layer in a thickness direction including the temperature of the solidified portion. Since the temperature of the metal mold is measured and the average temperature in the thickness direction of the metal mold can be measured, the temperature of the resin is referred to as the average temperature between the melted layer and the solidified layer in the thickness direction which includes the temperature of the solidified portion.

In Step 26, on the basis of the calculations in Step 24 and Step 25, a temporary molding condition at the time the resin is completely filled in the metal mold is set so that the temperature thereof is in the range of 190° C. to 200° C. in the periphery of the gate and the temperature thereof is in the range of 110° C. to 130° C. in the periphery of the end portion.

In Step 27, a demonstration test of the injection molding apparatus is carried out on the basis of the temporary molding condition. Specifically, a temperature sensor and a pressure sensor are installed in a position of the cavity corresponding to the advancing position area of the screw feeder, that is, a position where the screw feeder advances to the end point of a certain advancing position area and the leading end of the volume of the resin, which is injected to the cavity by the screw feeder, reaches, so as to mainly check whether or not the resin passes at a desired temperature in every advancing position area of the screw feeder.

In terms of the demonstration test, a regulation of the set parameter is possible. The values obtained by experience are fed back to the calculations in Steps 22, 24, and 25, and thus it is possible to shorten a total calculation time on the basis of the feed-back values.

In Step 28, the demonstration test is estimated. At this time, when the result of the demonstration test does not meet a certain condition, the present step returns to Step 22. Then the pressure parameter is changed and the procedures in Step 23 to 28 are carried out again.

As described above, as the end material approaches the last filled portion, a passing speed of the end material may sequentially and slowly, or gradually decrease.

When the resin is in a melted state and cooled, the injection is carried out at a temperature more than the inflection point T1 where the slope of the specific volume is steep. When the resin is further cooled, the injection is carried out at a temperature below the inflection point T2 where the slope of the specific volume is less steep, and in this case, a temperature of which the resin can flow may be a target temperature. As a preferable example of the temperature, the temperature of T1 is the average temperature in the range of 190° C. to 200° C. in the thickness direction. In this case, the injection is carried out at a temperature where the temperature of the melted layer excluding the solidified portion decreases to about 140° C. As a result, the temperature of T2 becomes the average temperature in the range of 110° C. to 130° C. in the thickness direction. In this way, the temperature can decrease.

When the resin is at the temperature below the inflection point where the slope of the specific volume is less steep and is at the temperature where a flow is possible at the time the resin reaches the end portion of the cavity, a variation in contraction volume is little per unit temperature, and thus a poor outer appearance caused by the variation in volume decreases.

In addition, the obtained data on the pass flow speed and the pass temperature of the end material may be stored in the memory as data stored in the memory 19. In this case, an injection molding apparatus may be provided by including an injector; a cavity; memory for storing the pass temperature data; a metal mold that have temperature sensors provided at an entrance side and an exit side of a high-flow stroke position area with high flow 1 and a low-flow stroke position area with low speed 2; a controller for monitoring a temperature condition obtained from the temperature sensors and an injection condition obtained from an injector and controlling the injector on the basis of the data stored in the memory; and a judgment portion for judging an abnormality on the basis of the injection condition.

Figure 1:
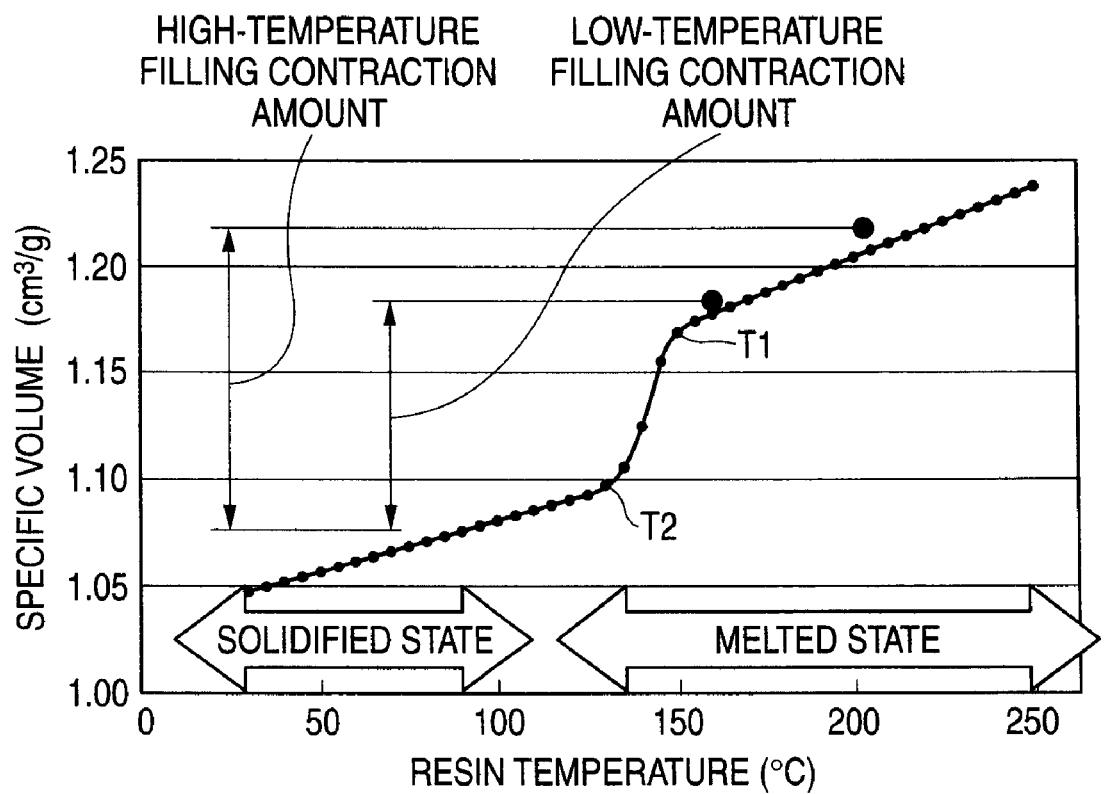
FIG. 1 is a graph showing a relation between a resin condition (temperature) and a specific volume.
Figure 4:
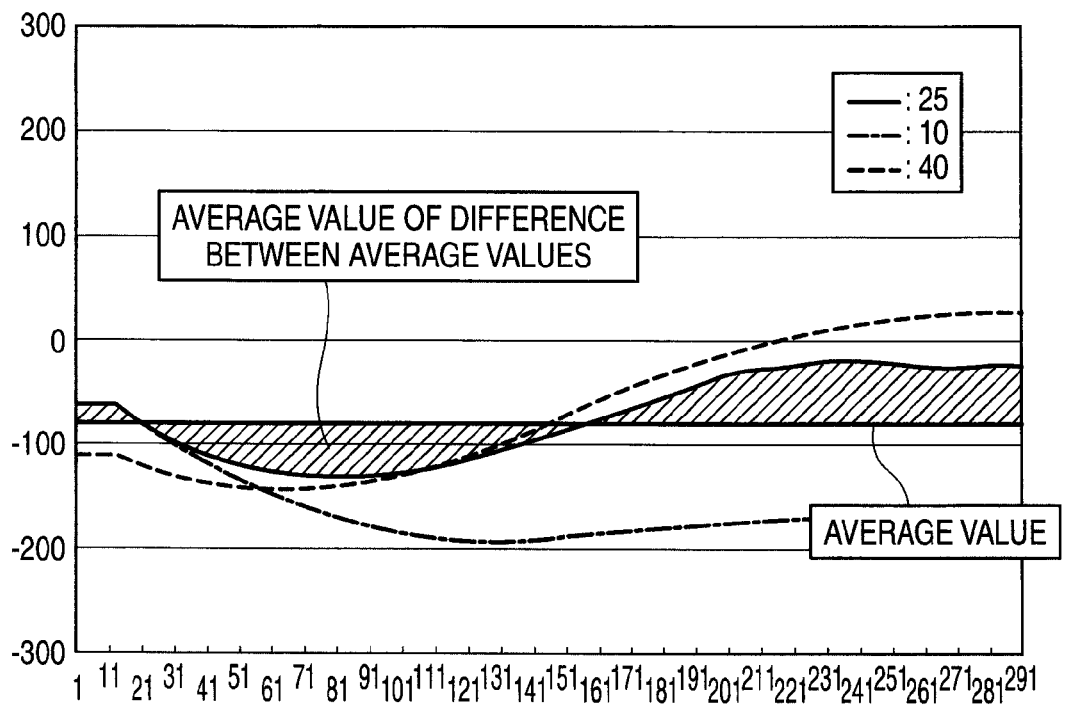
FIG. 4(a) is a graph showing roughness data.
FIG. 4(b) is a graph showing once differentiation.
FIG. 4(c) is a graph showing twice differentiation.
Figure 4:
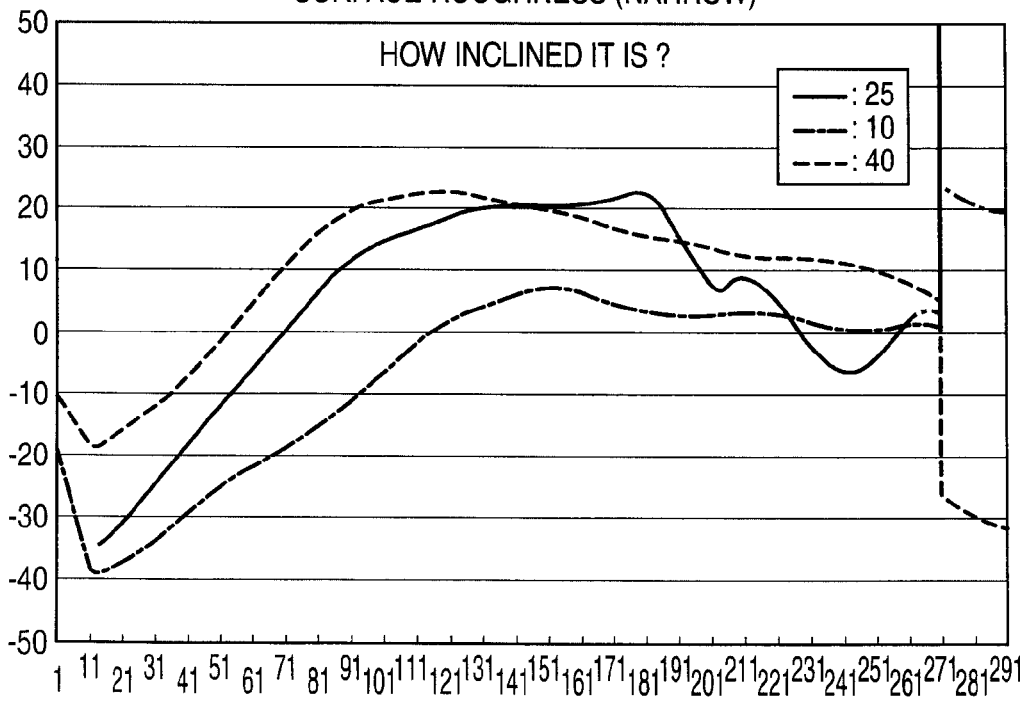

In FIGS. 4(a) to 4(c), FIG. 4(a) shows surface roughness data of the molded product that is formed by an injection using the metal mold shown in FIG. 1. FIG. 4(b) shows once differentiated surface roughness data of the molded product that is formed by the injection using the metal mold shown in FIG. 1. FIG. 4(c) shows twice differentiated surface roughness data of the molded product that is formed by the injection using the metal mold shown in FIG. 1.

FIG. 4(a) is a graph in which a subtraction value is plotted at every sampling position of a metal mold width 31, where a subtraction value is obtained by subtracting an average value (a straight line in the drawing) of the surface roughness data from surface roughness data of the molded product that is manufactured by a normal injection molding process. It has a tendency that an average value of difference between average values is plus at an entrance side (on the right side in the drawing) and is minus at an end side (on the left side in the drawing).

FIG. 4(b) is a graph showing once differentiation value of the surface roughness data of the molded product that is manufactured by the normal injection molding process. On the basis of the graph, it is possible to know how unevenness of the surface is inclined. It has a tendency that an entrance side (on the right side in the drawing) is minus and an end side (on the left side in the drawing) is plus.

FIG. 4(c) is a graph showing twice differentiation value of the surface roughness data of the molded product that is manufactured by the normal injection molding process. In the drawing, an area that is marked with slanted lines shows a frequency of the number of times of a waveform, and a peak value shows a magnitude of the waveform. At an entrance side of the drawing, a strong waveform exists, but the frequency thereof is low. At an end side of the drawing, a relatively weak waveform exists, but the frequency thereof is high. That is, it can be understood that a contraction amount of the resin at the end portion at the time the resin is solidified is large.

Figure 5:
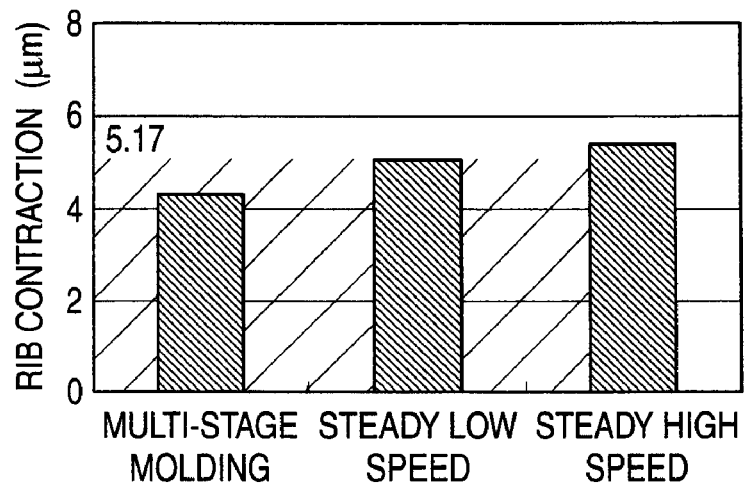
FIG. 5(a) is a graph showing a comparison between a different injection speed and a rib contraction value.
FIG. 5(b) is a graph showing twice differentiated area of surface roughness and a maximum value.
Figure 5:
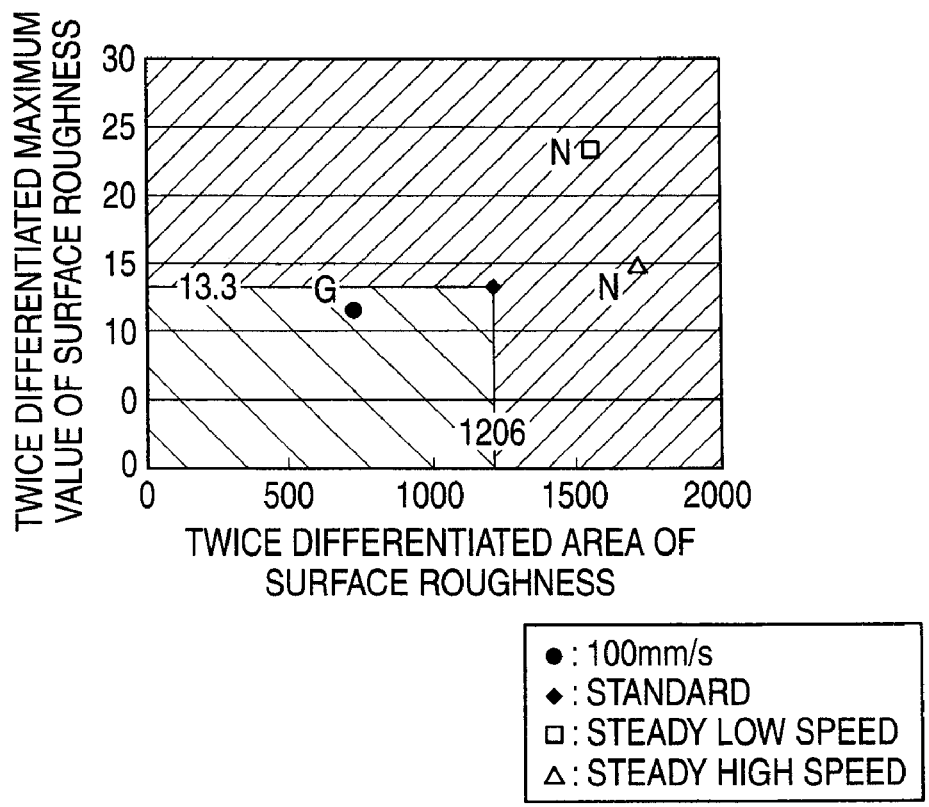

FIG. 5(a) shows a comparison between an injection speed of a resin injection and a rib contraction value. Additionally, Table 1 shows preset values and real measurement values at that time.

TABLE 1

| | INJECTION SETTING | | REAL MEASUREMENT | |
|---|---|---|---|---|
| | INJECTION SETTING | HOLDING PRESSURE | PRESSUE AT THE END PORTION | WAVE-FORM (MININUM) |
| STEADY SLOW SPEED | 120 mm/s | 40 MPa | 20.6 MPa | 23.3 |
| | | 50 MPa | 28.7 MPa | 13.3 |
| STEADY HIGH SPEED | 400 mm/s | 40 MPa | 24.3 MPa | 14.7 |
| MULTI STAGE | 500 → 100 → 10 mm/s | 40 MPa | 17.7 MPa | 11.4 |

At this time, when a speed of the steady high-speed injection on the right side is set to 400 mm/sec and a holding pressure is set to 40 MPa, as shown in Table 1, actual measurements are as follows: an end pressure is 24.3 MPa and a waveform (minimum) is 14.7. Then, as shown in FIG. 5(a) and Table 1, when a speed of the steady low-speed injection on the center side is set to 120 mm/sec and holding pressures are set to 40 MPa and 50 MPa, actual measurements are as follows: end pressures are 20.6 MPa and 28.7 MPa and waveforms (minimum) are 23.3 and 13.3, respectively.

When a speed of a multi-stage injection on the left side is sequentially set to 500 mm/sec, 100 mm/sec, and 10 mm/sec and a holding pressure is set to 40 MPa, as shown in Table 1, actual measurements are as follows: an end pressure is 17.7 MPa and a waveform (minimum) is 11.4.

FIG. 5(b) shows a graph where an area and a maximum value of twice differentiated surface roughness are plotted after measuring the surface roughness of molded products that are molded under the injection conditions of the steady high speed (Δ), the steady low speed (□), and the multi-stage molding (○). As it is clear from the graph, it is found that the area of twice differentiated surface roughness of the molded product that is formed by the multi-stage molding (○) is 1,260 unit and the maximum value thereof is 13.3 unit, which shows the flattest result. That is, a variation in flow of the inside of the mold affects a low-pressure surface stretching. Accordingly, a maximum mold clamping pressure of 2,565 tone in a normal molding process can decrease down to 1,676 tone by the use of the multi-stage molding process as well as a product quality is assured. As a result, the pressure can be lowered by 35%.

By employing an injection molding apparatus using an injection molding condition calculation method according to the invention, it is possible to increase a moldable range of a normal injector. Accordingly, a cycle of a molding process can increase. Further, a burr process is not necessary because of an improved product quality. Accordingly, an unmanned system is possible, which can reduce a cost. Furthermore, it is possible to handle a large-sized component in future.

Accordingly, it is possible to improve work efficiency in all industries using the injection molding.

While description has been made in connection with exemplary embodiments of the present invention, it will be obvious to those skilled in the art that various changes and modification may be made therein without departing from the present invention. It is aimed, therefore, to cover in the appended claims all such changes and modifications falling within the true spirit and scope of the present invention.

DESCRIPTION OF REFERENCE NUMERALS AND SIGNS

1 . . . INJECTION MOLDING APPARATUS, 2 . . . MOLD CLAMPING MECHANISM, 3 . . . TIE BAR, 4 . . . NOZZLE, 5 . . . MOVABLE METAL MOLD, 6 . . . FIXED METAL MOLD, 7 . . . BAND HEATER, 8 . . . HEATING CYLINDER, 9 . . . SCREW FEEDER, 10 . . . INJECTION DEVICE, 11 . . . INJECTION CYLINDER, 12 . . . HYDRAULIC MOTOR, 13 . . . HOPPER, 14 . . . CENTRAL CONTROL UNIT, 15 . . . TEMPERATURE/PRESSURE SENSOR, 16 . . . TEMPERATURE CONTROL UNIT, 17 . . . INJECTION CONTROL UNIT, 18 . . . ROTATION CONTROL UNIT, 19 . . . MEMORY, 20 . . . INTERFACE, 21 . . . PROGRAM START, 22 . . . PRESSURE SETTING, 23 . . . AREA DIVISION, 24 . . . ROUTINE OF HIGH-FLOW STROKE POSITION AREA WITH HIGH SPEED, 25 . . . ROUTINE OF LOW-FLOW STROKE POSITION AREA WITH LOW SPEED, 26 . . . TEMPORARY SETTING, 27 . . . DEMONSTRATION TEST PROCESS, 28 . . . EVALUATION PROCESS, 29 . . . PARAMETER SETTING PROCESS

What is claimed is:

1. An injection molding method of feeding a melted resin into a cavity of a metal mold by a nozzle including a screw feeder, wherein an injection stroke of the screw feeder is divided into a plurality of position areas, the method comprising:
    setting an injection rate of the screw feeder to be greatest at an injection start, and setting the injection rate to gradually decrease until an injection end, so that a temperature of a melted resin reaching an end portion of the cavity is as low as possible so long as the melted resin is not solidified; and
    calculating a pass temperature of the melted resin such that the injection rate is equal to a desired rate,
    wherein the pass temperature is a temperature of a leading edge of the melted resin taken as the leading edge of the melted resin passes an end point of each position area.

2. The injection molding method according to claim 1, wherein a plurality of nozzles are provided, the method comprising:
    setting the injection rate of the screw feeder of at least one of the plurality of nozzles at the injection start of the screw feeder to be the largest; and setting the injection rate of the screw feeder of the one of nozzles to gradually decrease until the injection end.

3. The injection molding method according to claim 1, further comprising the step of:
    setting a pressure applied to the melted resin filled in the cavity via the nozzle to 30 MPa or less.

4. The injection molding method according to claim 1 further comprising the steps of:

(1) inputting and recording the pass temperature in an electric recording medium by a program execution portion as a program in a system structured by an electric computer;

(2) forming a molded product by gradually varying the injection rate to a desired rate until the injection end based on the pass temperature, by using an injection molding apparatus which is capable of using the pass temperature;

(3) changing the injection rate at each of the position areas when the molded product does not meet a certain condition after the molded product is formed, and inputting the changed injection rate by the program execution portion; and (4) repeating the steps of calculating the pass temperature at the end point of each of the position areas so that the injection rate of the screw feeder gradually varies to the desired rate until the injection end, and inputting and recording the pass temperature in the electronic recording medium or physically recording in a recording medium to be usable by the program execution portion into which the pass temperature is input.

5. The injection molding method according to claim 1, wherein the injection rate at the injection start is a first injection rate $V_n$, where n=1, and an arbitrary coefficient is defined as $K_i$, where i=n such that $0<K_i<1$, the method further comprising the steps of:

a first step of setting a first arbitrary coefficient to be $K_i$;

a second step of setting and obtaining a second injection rate to be $V_{(n+1)}=K_i V_i$;

a third step of adding 1 to the previous n;

a fourth step of setting a subsequent arbitrary coefficient to be $K_i$;

a fifth step of setting and obtaining a subsequent injection rate from $V_{(n+1)}=K_i V_i$;

a sixth step of repeating the third to fifth steps until a temperature of the resin reaching the end portion of the cavity becomes a target temperature which is an average temperature in a thickness direction of a melted layer and a solidified layer including a temperature of a solidified portion; and a seventh step of finishing the setting of the injection rate so that the injection rate is gradually or sequentially decreased until the injection end, when the temperature of the resin reaching the end portion of the cavity becomes the target temperature.

6. An injection molding apparatus using the recorded pass temperature according to claim 4, the apparatus comprising:

an injector injecting a material;

a mold configuring a cavity to be filled with the injected material;

a memory for storing the pass temperature;

a temperature sensor disposed at cavity positions corresponding to an entrance side and an exit side of each injection stroke area;

a controller for monitoring a temperature condition of the temperature sensor and an injection condition of the injector and controlling the injector on the basis of the pass temperature stored in the memory; and a judgment portion judging an abnormality on the basis of the injection condition.

* * * * *

UNITED STATES PATENT AND TRADEMARK OFFICE
CERTIFICATE OF CORRECTION

PATENT NO. : 7,771,631 B2  
APPLICATION NO. : 11/954923  
DATED : August 10, 2010  
INVENTOR(S) : Honma et al.

Page 1 of 1

It is certified that error appears in the above-identified patent and that said Letters Patent is hereby corrected as shown below:

On the Title Page, in item (75), under "Inventors", in Column 1, Line 1, delete "Akhiro" and insert -- Akihiro --

Signed and Sealed this  
Twenty-ninth Day of March, 2011

David J. Kappos  
*Director of the United States Patent and Trademark Office*